United States Patent [19]
von Gynz-Rekowski

[11] Patent Number: 5,873,414
[45] Date of Patent: Feb. 23, 1999

[54] BYPASS VALVE FOR DOWNHOLE MOTOR

[75] Inventor: Gunther von Gynz-Rekowski, Houston, Tex.

[73] Assignee: Pegasus International, Inc., Georgetown, Cayman Islands

[21] Appl. No.: 923,044

[22] Filed: Sep. 3, 1997

[51] Int. Cl.[6] ............................................. F16J 15/40
[52] U.S. Cl. ........................ 166/319; 166/141; 166/147; 251/63; 277/27
[58] Field of Search ............................ 166/53, 105, 112, 166/141, 142, 147, 151, 319; 251/63; 277/27

[56] References Cited

U.S. PATENT DOCUMENTS

| | | |
|---|---|---|
| 2,490,511 | 12/1949 | Courtot . |
| 4,103,903 | 8/1978 | Cariotti et al. ............................ 277/27 |
| 4,204,689 | 5/1980 | Johansson ................................. 277/27 |
| 4,256,314 | 3/1981 | Berglund et al. . |
| 4,258,925 | 3/1981 | Guyton . |
| 4,948,925 | 8/1990 | Winters et al. ...................... 166/113 X |
| 5,253,713 | 10/1993 | Gregg et al. ......................... 166/70 X |
| 5,295,534 | 3/1994 | Porter . |

*Primary Examiner*—Roger Schoeppel
*Attorney, Agent, or Firm*—Rosenblatt & Redano P.C.

[57] ABSTRACT

A bypass valve, particularly useful for allowing a tubing string to fill or drain during tripping in and tripping out, is disclosed. The bypass valve can be used in conjunction with a downhole motor operated through a tubing string. The bypass valve features a movable tapered valve member which has a smaller taper than the valve seat to prevent dragging the sealing element across sharp edges as the valve closes. Ports are provided through the valve to conduct upstream pressure in the valve behind the sealing element so that upon contact of the sealing element on the valve member with the seat, a boost force is applied to help retain the seal.

12 Claims, 4 Drawing Sheets

BYPASS VALVE FOR DOWNHOLE MOTOR

FIELD OF THE INVENTION

The field of this invention relates to bypass valves which facilitate filling and emptying of tubulars run-in or tripped out of the wellbore, and is particularly applicable to directional drilling with a downhole motor.

BACKGROUND OF THE INVENTION

Directional drilling is frequently performed with fluid-powered downhole motors. The fluid-powered downhole motor is run-in on a tubing string which can be made of joints which are run-in from the surface in sequence. At the conclusion of the operation, the process is reversed. In order to put together the tubing string with the downhole motor so that the motor can be spotted in the appropriate location or advanced during the drilling operations, allowances have to be made for filling or emptying the tubing string as the tubing string is enlarged or shortened, respectively. That is, as additional stands are connected at the surface and run downhole, fluid in the wellbore needs to be admitted into the tubing string to prevent a pressure imbalance on the tubing string which would tend to put a collapse force on it. In essence, the bypass valve located adjacent the downhole motor admits well fluids into the tubing string as additional stands are added at the surface. Similarly, when the process is reversed, hydrostatically pressured fluid in the tubing string above the downhole motor drains into the wellbore as stands are removed from the top of the string.

Bypass valves have been used in the past which when in the open position, allow fluid communication between an annular space around the tubing string and the tubing string to facilitate filling and/or draining the tubing string during the operations of running in or tripping out of the hole. These bypass valves were designed to close if flow under pressure was applied in the tubing string so as to allow the downhole motor to operate. These valves presented reliability problems, primarily due to undesired leakage, which lessened the performance of the downhole motor. Accordingly, they have fallen into greater disuse due to their unreliability.

One such known bypass valve design is illustrated in FIGS. 1 and 2 of this application. A tubing string (not shown) is connected to the bypass valve 10 at thread 12. Inside of bypass valve 10 is a central bore 14 in communication with a sliding sleeve 16. Sleeve 16 is biased by spring 18 to the position shown in FIG. 1. In the FIG. 1 position, openings 20 are in fluid communication with annular space 22, which is in turn in communication with outlets 24. In the position shown in FIG. 1, the pressure drop without flow or with low flow across the sleeve 16 is insufficient to overcome the force of spring 18, and the sleeve 16 stays in the open position, allowing flow, represented by arrows 24, to go in either direction through openings 20. Below the lower end 26 of sleeve 16 is a seal bushing 28. Cylindrical seal surface 30 on sleeve 16 is pushed into bushing 28 when the spring 18 is compressed due to applied fluid pressures in bore 200 of sleeve 16. This position is illustrated in FIG. 2. At the lower end of the bypass valve 10 is thread 32 to which is connected a tubular 34, which ultimately supports the downhole motor (not shown).

Those skilled in the art will appreciate that rather than having a cylindrical sealing surface 30 being forced into a bushing such as 28, the body of the bypass valve 10, in the area of bushing 28, can have one or more O-rings and grooves or, alternatively, the cylindrical surface 30 can accommodate O-ring grooves and O-rings and have those rings forced into a seal bore which would be in place of the bushing 28. Regardless of the configuration, whether as shown in FIGS. 1 and 2, or through the use of O-rings, the problem of reliability of the seals has arisen. The primary reason for the problem is that the sealing medium, such as the seal bushing 28 of FIG. 1, is adversely affected by sharp corners, such as the edges of the openings 20 and the sharp corners 36 found at the lower end 26 of the sleeve 16. Grit in the mud is another source of potential seal problems. Another problem is that as soon as there is some sealing contact, such as between surface 30 and bushing 28, a differential pressure develops across the point of contact which further aggravates the interaction of sharp corners, such as 36, with the bushing 28. In essence, a shearing force acts across the seal which, if it is an O-ring, can rip it or yank it out of its groove.

For these reasons, the designs in the past, as shown in FIGS. 1 and 2, have proven not to be reliable and have gone into relative disuse. The absence of a bypass valve presents difficulties in tripping in and tripping out. While tripping out, a bypass valve is important so that fluid can drain back into the wellbore as stands are removed at the surface. Without such a bypass valve in the wellbore, when joints are unthreaded at the surface and if they're still full of mud, the mud will spill all over the rig floor. This creates environmentally unacceptable situations, particularly in offshore applications using oil-based muds. Without the bypass valve, each stand, as it is pulled out, is still full of mud which will spill out on the rig floor when a joint is broken. In running in, the bypass is important to allow the additional stands that are added to the string to fill as they are added. With no bypass valve, filling has to be done manually after every so many stands have been added to the string. If filling is not done manually and no bypass valve is operational to fill the string automatically, hydrostatic differential pressures can exist on the tubing which unduly stress it, possibly to the point of collapse if allowed to go uncorrected. Thus, in the past, operators have manually filled the string every 10 joints. This is a cumbersome procedure that takes time which creates cost for the operator.

Accordingly, the object of the present invention is to provide a reliably operating bypass which eliminates the design flaws of the prior art and presents, in a compact design, a valve which can reliably allow bi-directional flow until applied pressure from the surface closes it for operation of the downhole motor. Another objective in increasing the reliability of the bypass valve is to prevent dragging sealing members past sharp corners and to employ the pressures already existing in the valve for a boost force to ensure proper sealing once the sealing members have contacted. These and other features of the invention will become apparent to those skilled in the art from a review of the specification below.

Of general interest in the area of seals are U.S. Pat. Nos. 2,495,011; 4,256,314; 4,258,925; and 5,295,534.

SUMMARY OF THE INVENTION

A bypass valve, particularly useful for allowing a tubing string to fill or drain during tripping in and tripping out, is disclosed. The bypass valve can be used in conjunction with a downhole motor operated through a tubing string. The bypass valve features a movable tapered valve member which has a smaller taper than the valve seat to prevent dragging the sealing element across sharp edges as the valve closes. Ports are provided through the valve to conduct upstream pressure in the valve behind the sealing element so that upon contact of the sealing element on the valve member with the seat, a boost force is applied to help retain the seal.

DETAILED DESCRIPTION OF THE PREFERRED EMBODIMENT

Figure 1:
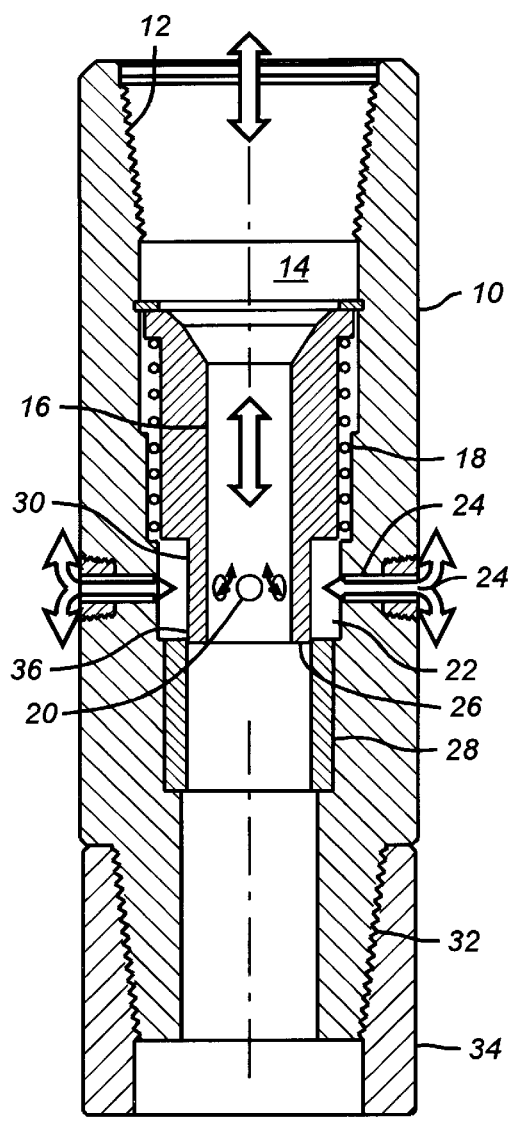
FIG. 1 is a sectional elevational view of a prior art design, shown in the open position.
Figure 2:
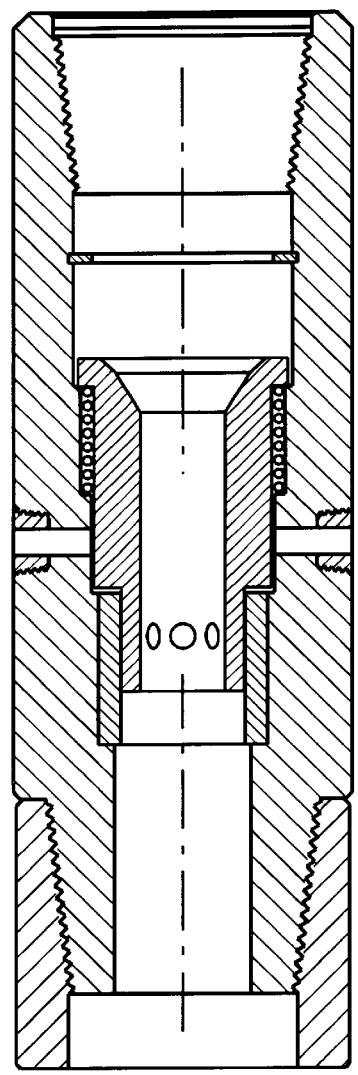
FIG. 2 is the design of FIG. 1 in the closed position.
Figure 3:
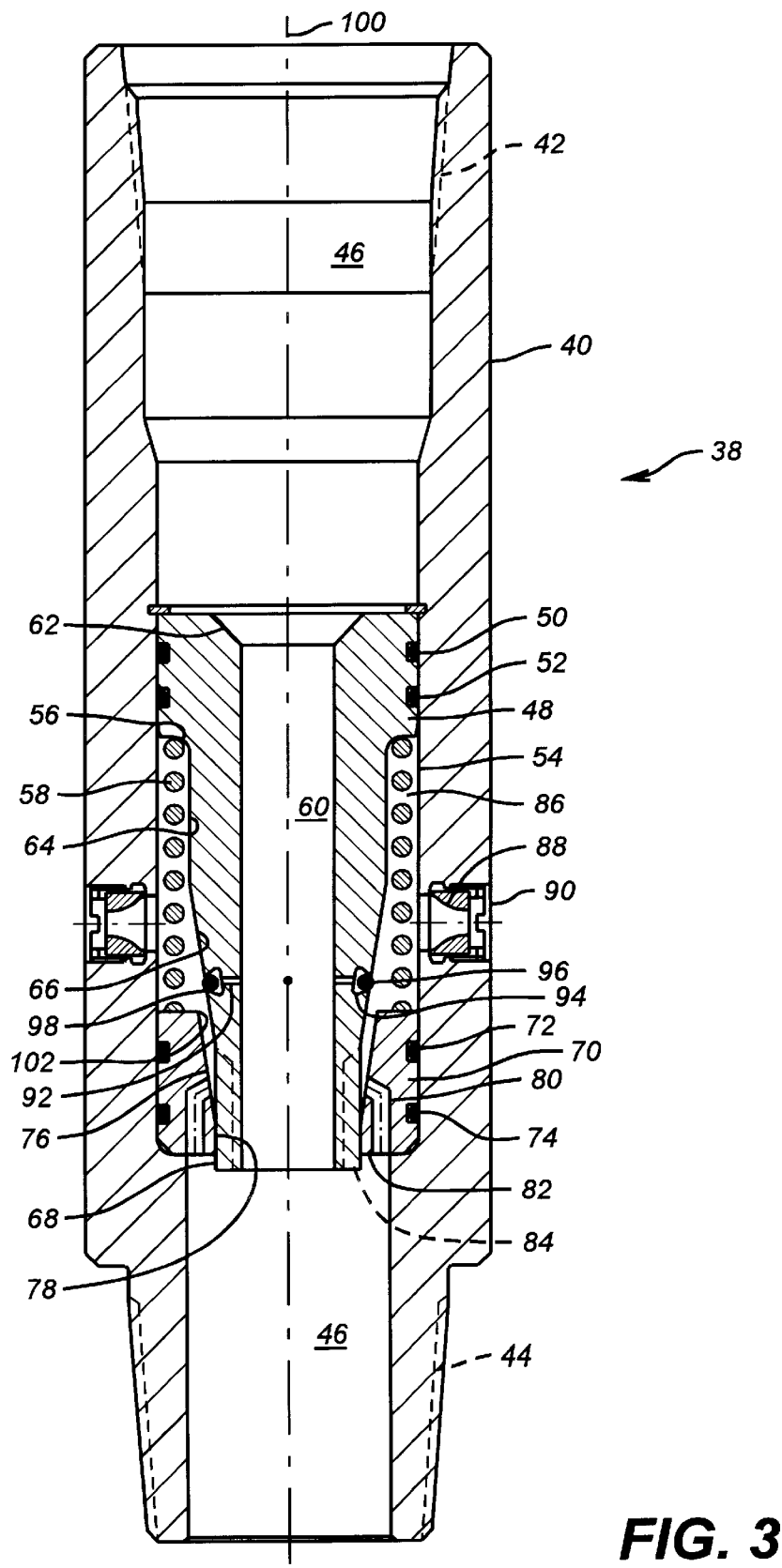
FIG. 3 is a sectional elevational view of the bypass valve of the present invention, shown in the open position.

Referring to FIG. 3, the bypass valve 38 has a body 40, with a thread 42 at its upper end. The tubing string (not shown) is connected at thread 42. At the lower end is thread 44, which supports the downhole motor and the remainder of the bottomhole assembly, which is not shown. Inside of body 40 is bore 46. Mounted within bore 46 is valve member 48. O-ring seals 50 and 52 seal between the valve member 48 and bore wall 54. The valve member 48 has an inside shoulder 56 on which bears spring 58. Central to the valve member 48 is a bore 60, which is of a smaller diameter than bore 46. A transitional bore 62 is located at the upper end of bore 60 to direct flow through the valve 38 smoothly into bore 60. Those skilled in the art will appreciate that a sufficient flow directed through the valve 38 will ultimately create a differential pressure across O-ring seals 50 and 52 which will drive the valve member 48 downwardly, as seen by comparing FIGS. 3 and 4. Movement of the valve member 48 downwardly compresses spring 58 and will put the valve 38 in closed position of FIG. 4.

Adjacent the inside shoulder 56 on the valve member 48 is a relatively straight section 64, followed by a tapered section 66, followed by a cylindrically shaped lower end 68. Lower end 68 extends through seat 70, which is sealingly secured to the bore wall 54 by virtue of O-ring seals 72 and 74. Internally, the seat 70 has a taper 76 above a cylindrical segment 78. A passage 80 extends from lower end 82 and into tapered surface 76. Lower end 68 of the valve member 48 has a plurality of cutouts 84, shown in dashed lines, to facilitate normal flow from passage 80 into cavity 86 and through nozzle 88 and eventually out through outlets 90. It should be noted that there are a plurality of outlets, each having preferably a removable nozzle which can be replaced for wear. In the position shown in FIG. 3, the flow can be in both directions through the passage 80, depending on the activity. That is, if the tubing is being pulled out of the hole, the flow will be from passage 80 out through the outlets 90. If tubing is being added at the surface, the flow will be in from outlet 90 into cavity 86 through passage 80 and into bore 46.

Another feature of the valve member 48 is a passage 92, each one of which extends from bore 60 to groove 94. As seen in section in FIGS. 3 and 4, groove 94 appears triangular, having a small opening in taper 66 so that the opening 96 retains the O-ring 98 within groove 94.

With respect to the longitudinal axis 100, the diameter of the upper opening formed by taper 76 is greater than the diameter of the lower opening formed by taper 66. As a result of this configuration, the O-ring 98 does not contact the sharp edge 102 on the seat 70. Thus, as a differential pressure is applied to the valve member 48 from flow at the surface passing through bore 46, the spring 58 is compressed, and the valve member 48 begins to move downwardly to the position shown in FIG. 4. As the valve member 48 moves downwardly, the O-ring 98 clears past the sharp edge 102 prior to making contact with taper 76. Thus, the difference in diameters between tapers 66 and 76 eliminates potential tearing, ripping, or gouging of the O-ring 98, as would have occurred had it been dragged across the sharp edge 102.

As soon as the O-ring 98 engages a portion of taper 76, a differential pressure immediately builds across it. That differential pressure is the difference in pressure between the pressure in bore 60 and in the annular space around valve 38 at outlet 90. To in part counteract this differential pressure that acts shearingly across the O-ring segment extending outwardly beyond the taper 66 and into contact with taper 76, the higher pressure found in bore 60 at the time of movement of valve member 48 is also acting behind the O-ring 98 through the passage 92. Those skilled in the art will appreciate that although two passages 92 are illustrated, any number can be used to supply sufficient fluid communication to the back side of the O-ring 98 to force it substantially laterally against the taper 76. Thus, the boost force that is applied automatically to the O-ring 98, once it seats at all against taper 76, comes from passages 92 which always see the pressure in bore 60.

Thus, the combination of moving the O-ring seal 98 around a potentially sharp edge, such as 102, improves the performance of the bypass valve 38. Additionally, the pressures in the generally radial direction, that is, in a substantially perpendicular direction to the longitudinal axis 100, acting on the back side of the O-ring 98 when it makes contact with the taper 76, overcome the tendency of the differential pressure across the O-ring 98 to shear or otherwise tear it. The passages 92 preferably are sloped so that the force on O-ring 98 is normal to tapered surface 66.

Figure 5:
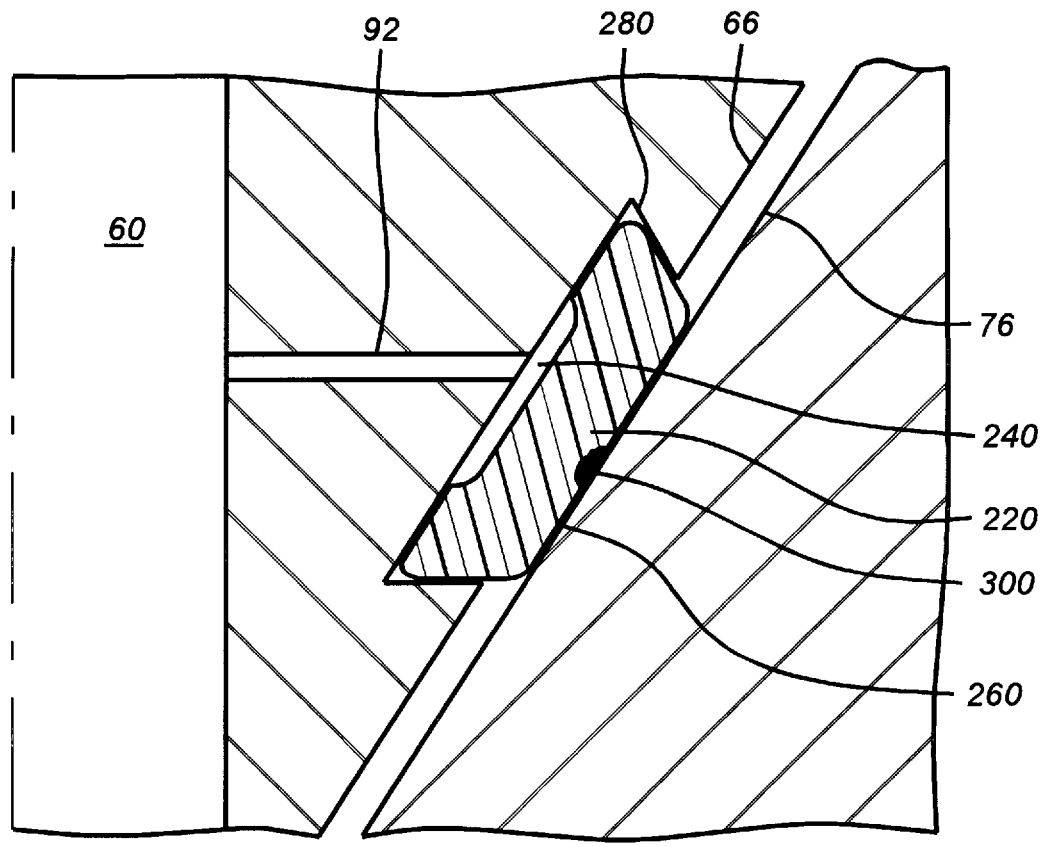
FIG. 5 is a sectional elevational view of the sealing area of the present invention, shown in the closed position.

A sealing element 220 is furthermore recommended, as shown in FIG. 5, to enhance the sealing effect using pressure in bore 60, which acts in a radial direction on the sealing element 220. The sealing element 220 is vulcanized in the slot 280. If the bypass valve is closed, the pressure in bore 60 in a radial direction will push out the sealing element 220 and create a fluid cushion 240, as depicted by a void space, behind the sealing element 220. Therefore, a tight seal 260 is created which can accommodate small particles 300.

Figure 4:
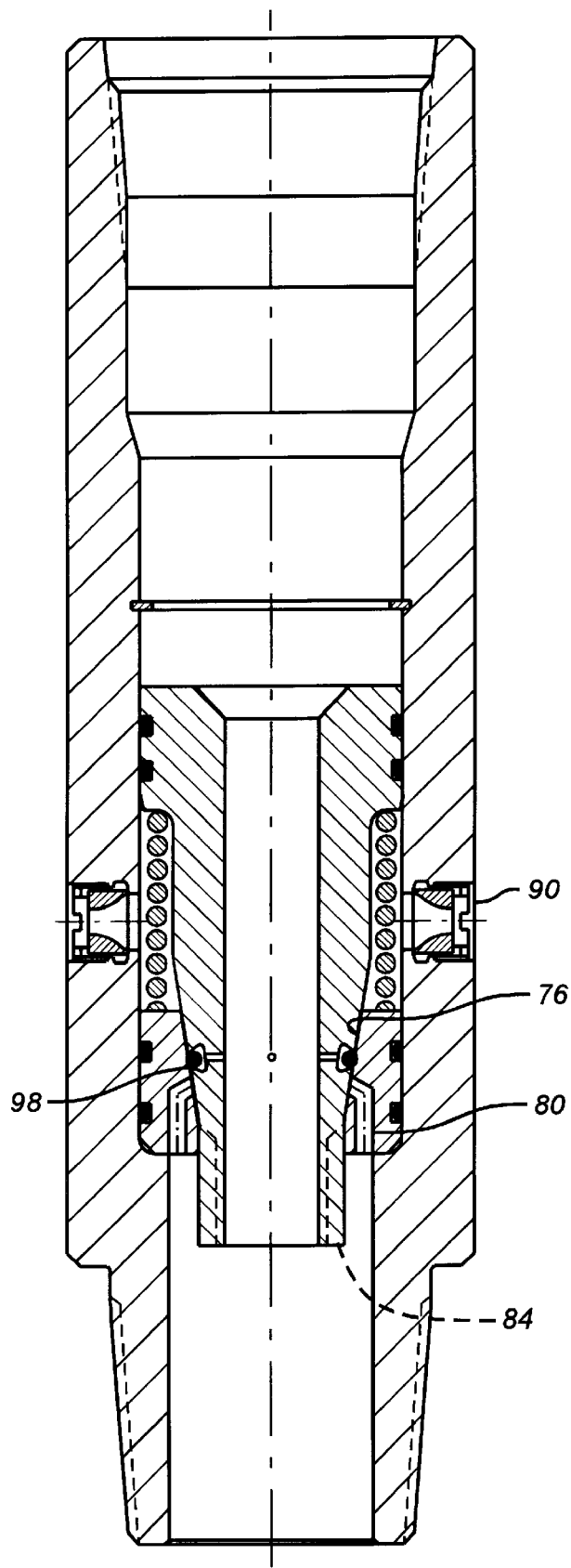
FIG. 4 is a sectional elevational view of the valve of the present invention, shown in the closed position.

It will be noted by examining FIG. 4 that the cutouts 84 in the closed position have moved below passage 80 and are isolated from outlets 90 by the contact of O-ring 98 on taper 76.

The foregoing disclosure and description of the invention are illustrative and explanatory thereof, and various changes in the size, shape and materials, as well as in the details of the illustrated construction, may be made without departing from the spirit of the invention.

I claim:

1. A sealing system for a valve, comprising:
   a body;
   a valve member movable in said body;
   a seat in said body;
   a seal for sealing between said valve body and said seat as a result of a mechanical force due to movement of said valve member toward said seat; and
   a fluid passage in flow communication with said seal to direct pressure in said body against said seal to increase the force on said seal against said seat beyond said mechanical force.

2. The system of claim 1, wherein:

said seal is mounted on the valve member and said passage extends to said seal through the valve member.

3. The system of claim 2, wherein:

said body has an inlet and an outlet whereupon contact of said seal with said seat, a pressure gradient develops between said inlet and said outlet, said passage communicating with the higher pressure of said gradient in said body for an automatic hydraulic boost force on the seal upon its contact with said seat.

4. The system of claim 3, wherein:

said valve member moves into said seat to bring said seal against said seat;

said seat having an opening which defines a sharp edge; and said valve member configured so as to allow said seal to move past said sharp edge on its way to contact with the seat without contact with said sharp edge.

5. The system of claim 4, wherein:

said valve member comprises a piston with a bore therethrough;

said body further comprises a biasing member acting on said piston;

whereupon flow through said bore creates a force on said piston to move said seal against said seat.

6. The system of claim 5, wherein:

said piston has a taper in which said seal is mounted;

said seat is tapered adjacent said sharp edge; and said seal positioned in said taper on said piston in a manner that its initial contact with said seat is along said taper on said seat.

7. The system of claim 2, wherein:

said seal is mounted in a groove which is shaped to retain said seal against fluid pressure acting on it from said passage.

8. The system of claim 2, wherein:

said body comprising an inlet, an outlet, and a bypass port;

said seal, when moved against said seat, isolates the bypass port from said inlet and outlet;

whereupon initial contact between said seal and said seat, a pressure differential occurs across said seal from said outlet toward said bypass port; and said passage providing a fluid force on said seal transversely to a shearing force created by said differential pressure.

9. The system of claim 8, wherein:

pressure in said passage forces said seal around solid material which may be adhered to the seal to complete a seal against said seat despite the presence of the solid material.

10. The system of claim 9, wherein:

pressure from said passage acting on said seal compresses a portion of the seal within a groove retaining said seal to create a cavity within said groove defined by said seal as the seal is forced against said seat.

11. The system of claim 2, wherein:

pressure in said passage forces said seal around solid material which may be adhered to the seal to complete a seal against said seat despite the presence of the solid material.

12. The system of claim 11, wherein:

pressure from said passage acting on said seal compresses a portion of the seal within a groove retaining said seal to create a cavity within said groove defined by said seal as the seal is forced against said seat.

* * * * *